US008238935B2

(12) United States Patent
Chen et al.

(10) Patent No.: US 8,238,935 B2
(45) Date of Patent: Aug. 7, 2012

(54) REAL-TIME LOCATION INFORMATION FROM MOBILE DEVICES INCLUDING EMBEDDING LOCATION INFORMATION IN MEDIA PACKET PAYLOAD

(75) Inventors: Wen-hsiung Chen, Sunnyvale, CA (US); Feng Cao, Sunnyvale, CA (US); Gary Fu-Jen Cheng, Sunnyvale, CA (US); Saadat Malik, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 995 days.

(21) Appl. No.: 12/127,662

(22) Filed: May 27, 2008

(65) Prior Publication Data

US 2009/0298512 A1    Dec. 3, 2009

(51) Int. Cl.
*G06F 15/16*    (2006.01)
(52) U.S. Cl. .................. 455/456.1; 455/456.2
(58) Field of Classification Search .......... 455/456.1, 455/456.2; 370/349, 392
See application file for complete search history.

(56) References Cited

U.S. PATENT DOCUMENTS

2006/0203762 A1* 9/2006 Taubenheim et al. ......... 370/328
2008/0318593 A1* 12/2008 Cao et al. .................. 455/456.1

OTHER PUBLICATIONS

Wiegand, Thomas, Gary J. Sullivan, Gisle Bjontegaard, and Ajay Luthra. "Overview of the H.264/AVC video coding standard." Jul. 2003.*IEEE Transactions on Circuits and Systems for Video Technology*. Retrieved May 6, 2008: http://ieeexplore.ieee.org/iel5/76/27384/ 01218189.pdf.
Portele, Clemens, ed. "OpenGIS Geography Markup Language (GML) Encoding Standard." Open Geospatial Consortium, Inc. Aug. 27, 2007. Retrieved May 8, 2008: http://www.opengeospatial.org/standards/gml#downloads.
Digital Broadcasting Video Board Office. "Specification for the use of Video and Audio Coding in Broadcasting Applications based on the MPEG-2 Transport Stream." Feb. 2007. DVB Document A001 Rev. 7. Retrieved May 10, 2008: www.dvb.org/technology/standards/a001r7.tm1214r30.dTS101154.v1.8.1.pdf.
International Organization for Standardization. International Standard Iso/Iec 13818-1 "Generic coding of moving pictures and associated audio: systems, Recommendation H.222.0" $2^{nd}$ edition. Nov. 13, 1994. Geneva, Switzerland. Retrieved May 8, 2008: www.iso.ch.
S. Wenger, M.M. Hannuksela, T. Stockhammer, M. Westerlund, and D. Singer. "RTP Payload Format for H.264 Video." Feb. 2005. IETF RFC RFC 3984. Retrieved May 6, 2008: www.ietf.org.
Society of Motion Picture and Television Engineers."SMPTE Draft Recommended Practice for Television." RP227: VC-1 Bitstream Transport Encodings. Aug. 23, 2005. White Plains, NY. Retrieved May 7, 2008: www.smpte.org.

* cited by examiner

*Primary Examiner* — Sam Bhattacharya
(74) *Attorney, Agent, or Firm* — Dov Rosenfeld; Inventek (57) ABSTRACT

One embodiment includes a method in a mobile device, including accepting real-time location information on the location of the mobile device, and ascertaining whether real-time information is to be included. In the case it is ascertained that real-time location information is to be embedded, the method includes embedding the accepted location in a payload portion of a media packet; and sending the packets to one or more recipients. At least some of the sent packets include location information embedded in the payload portion.

26 Claims, 8 Drawing Sheets

```
<gml:location>
<gml:Point gml:id="p1" srsName="epsg:4326">
<gml:coordinates>31:56:00S 115:50:00E</gml:coordinates>
</gml:Point>
</gml:location>
```

REAL-TIME LOCATION INFORMATION FROM MOBILE DEVICES INCLUDING EMBEDDING LOCATION INFORMATION IN MEDIA PACKET PAYLOAD

FIELD OF THE INVENTION

The present disclosure relates generally to location services and to mobile devices sharing real-time location information while communicating media data.

BACKGROUND

With rapid advances in wireless networking, Internet protocol (IP) mobility has become more common for mobile users in maintaining connectivity, and allowing communication with other mobile users. Information on the location of mobile units may be desirable for various purposes. For example, in emergency services such as fire departments, it may be desirable to have real-time information on the location of each firefighter. Another example involves law enforcement, where dynamic positions of police officers can be helpful in managing various situations and/or operations. In these cases, identifying a particular location in need of help, directing a search path, as well as avoiding unnecessary actions, can be useful.

Mobile devices such as mobile phones, mobile smart phones, laptops computers, etc., are known that transmit media information in real time using packetized formats. There is a desire for such mobile devices to also indicate their location by transmitting location information. Some conventional approaches for providing location information use, during a setup time, signaling messages that include the location information, with subsequent updating from time to time. However, such approaches may require excessive signaling if the location changes rapidly. Also, such signaling paths might be different than the media paths. Furthermore, secrecy often is desired. Intermediate nodes along the signaling paths may inadvertently disclose information, so that location information embedded in signaling paths might be disclosed via intermediate nodes. For real time data, such a media data, one alternate approach is to embed the location information into the packets of Real-time Transport Control Protocol (RTCP), which is often used to pair with one media stream for providing more information about the stream. However, many mobile devices do not support RTCP. Some intermediate devices, such as firewalls, may block RTCP for reasons of security. Furthermore, RTCP, when used, often has RTCP packets being sent relatively infrequently. Yet another known approach is to define an extension to the header Real Time Protocol (RTP) packets in order to carry location information, and to thus embed location information in RTP headers using the defined extension. Compressed RTP (cRTP) is known and often used to pass RTP packets over some slow links. Such cRTP cannot work well with such a RTP header extension, especially when real-time location information is heavy.

DESCRIPTION OF EXAMPLE EMBODIMENTS

Overview

Embodiments of the present invention include a method, and apparatus, and a computer readable medium with instructions that when executed cause carrying out of the method. The method is usable for sharing real-time location for mobile users through an extension in media formats. The method can be easily applied to some existing multimedia formats as well as to proprietary and to future multimedia formats using security mechanisms, such as secure RTP (sRTP), that can provide secure real-time location information from end-to-end without any involvement of the signaling paths.

Embodiments of the present invention include a method in a mobile device that sends media packets, a method in a apparatus operative to receive media packets, an apparatus operative to send media packets, an apparatus operative to receive media packets, a computer readable medium with instructions that when executed in a mobile station cause carrying out of the method in the mobile station. And a computer readable medium with instructions that when executed in an apparatus operative to receive media packets cause carrying out of the method in the apparatus operative to receive media packets.

One embodiment includes an apparatus comprising a location information receiver/determiner operative to receive and/or determine the location of the apparatus and a processing system including one or more processors and a memory portion. The apparatus is operative to transmit media information as media packets that include a payload portion. The processing system has stored therein instructions that when executed by one or more processors of the processing system cause location information related to the real-time location of the apparatus to be embedded in the payload portion of at least some of the media packets, such that the apparatus is operative to transmit media information as media packets that include in the payload portion thereof real time location information on the location of the apparatus.

One embodiment includes a method in a mobile device. The method comprises accepting real-time location information on the location of the mobile device, and ascertaining whether real-time information is to be included, the ascertaining being according to one or more criteria. In the case it is ascertained that real-time location information is to be embedded, the method comprises embedding the accepted location in a payload portion of a media packet; and sending the packets including location information in at least some of the packets.

One embodiment includes a computer-readable medium having encoded thereon instructions that when executed by one or more processors of a processing system cause carrying out a method. The method is in a mobile device and comprises accepting real-time location information on the location of the mobile device, and ascertaining whether real-time information is to be included, the ascertaining being according to one or more criteria. In the case it is ascertained that real-time location information is to be embedded, the method comprises embedding the accepted location in a payload portion of a media packet; and sending the packets including location information in at least some of the packets.

One embodiment includes a method comprising receiving packets of a media stream or program from a mobile device, the packets including a payload portion that includes compressed media data. The method further comprises parsing a received packet; and ascertaining if location information is embedded in the payload portion of the received packet. The method includes, in the case location information is embedded, extracting the location information. In the case location information is embedded, the location information was embedded in the payload portion by the mobile device and is indicative of the location of the mobile device.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Particular Embodiments

Figure 1:
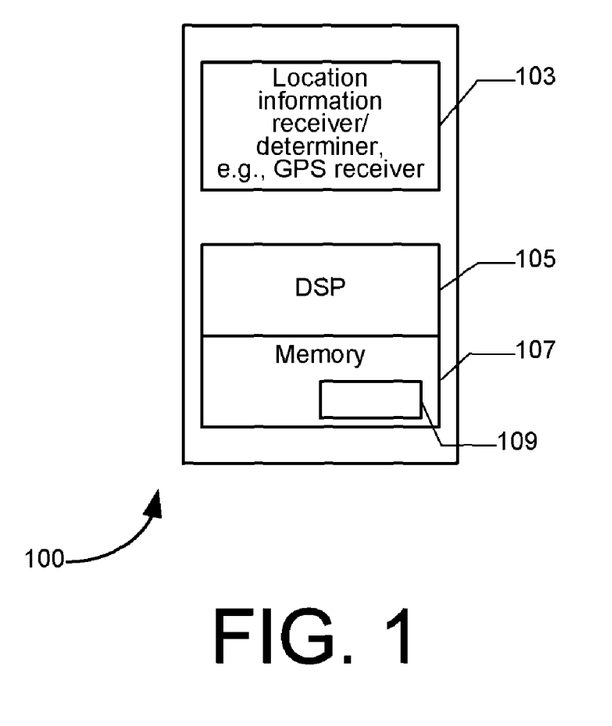
FIG. 1 shows a simplified block diagram of a mobile device that includes an embodiment of the present invention.

FIG. 1 shows a simplified block diagram of a mobile device 100 that includes an embodiment of the present invention. In order not to obscure inventive aspects, some details of the mobile device are not shown. For example, in the case of a wireless mobile device, such elements as a wireless transceiver, a display screen, microphone, keyboard, loudspeaker device, and so forth, are not shown, and those in the art will understand that such elements are included in such a mobile device.

Mobile device is operative to transmit media information in packet form. The mobile device includes a location information receiver or determiner 103 operative to receive and/or determine the location of the device. In one embodiment, the location information receiver/determiner 103 includes a GPS receiver that is operative to generate location information by receiving data from a plurality of GPS satellites using methods known in the art. In another embodiment, the location information receiver/determiner is operative to determine location information using one or more other location determining methods. Such methods are known in the art, and include methods that use signal strength information of signals received from base stations or access points that are at known locations. In another embodiment, the mobile device participates in network-based location sharing, and receives location information using such a service.

In one embodiment, the mobile device further includes a processing system that includes one or more processors, e.g., a DSP device 105 including a memory portion 107 that has stored thereon instructions 109, that is, a computer program that when executed by one or more processors of the processing system 105 causes a method to be carried out. The method includes a method embodiment of the present invention.

The mobile device 105 is operative to form media packets and to send out the media packets to one or more recipients. One feature of the invention is including real-time location information in one or more of the packets, in particular, by embedding the real-time location information in the payload portion of at least some of the packets.

The one or more recipients may be one or more specific recipients, e.g., a base station, or another mobile device via the base station, or may be a set of recipients, e.g., by multicasting.

In some embodiments, the mobile device 105 is operative also to receive and forward multimedia information that arrives in the form of media packets. In some such embodiments, the mobile device 105 is operative to embed real-time location information about its location in the payload portion of at least some of the packets before sending to packets.

Embodiments of the invention assume Internet Protocol (IP) packets are used, and that the media stream(s) in IP are formatted according to Real Time Protocol (RTP) as described in Internet Engineering Task Force (IETF) Request for Comments (RFC) RFC 3550. RTP is very often used these days to carry real-time data via IP. However, particular embodiments can also use any other suitable media format. Further, any suitable type of media stream and/or modality, e.g., audio, video, teletext/subtitling, etc., can be supported in particular embodiments.

Furthermore, if security is important, than secure RTP (sRTP), e.g., as defined IETF RFC 3711 is used. The invention, however, is not limited to such secure protocol, and other methods of ensuring security for real time media stream packets also may be used.

Figure 2:
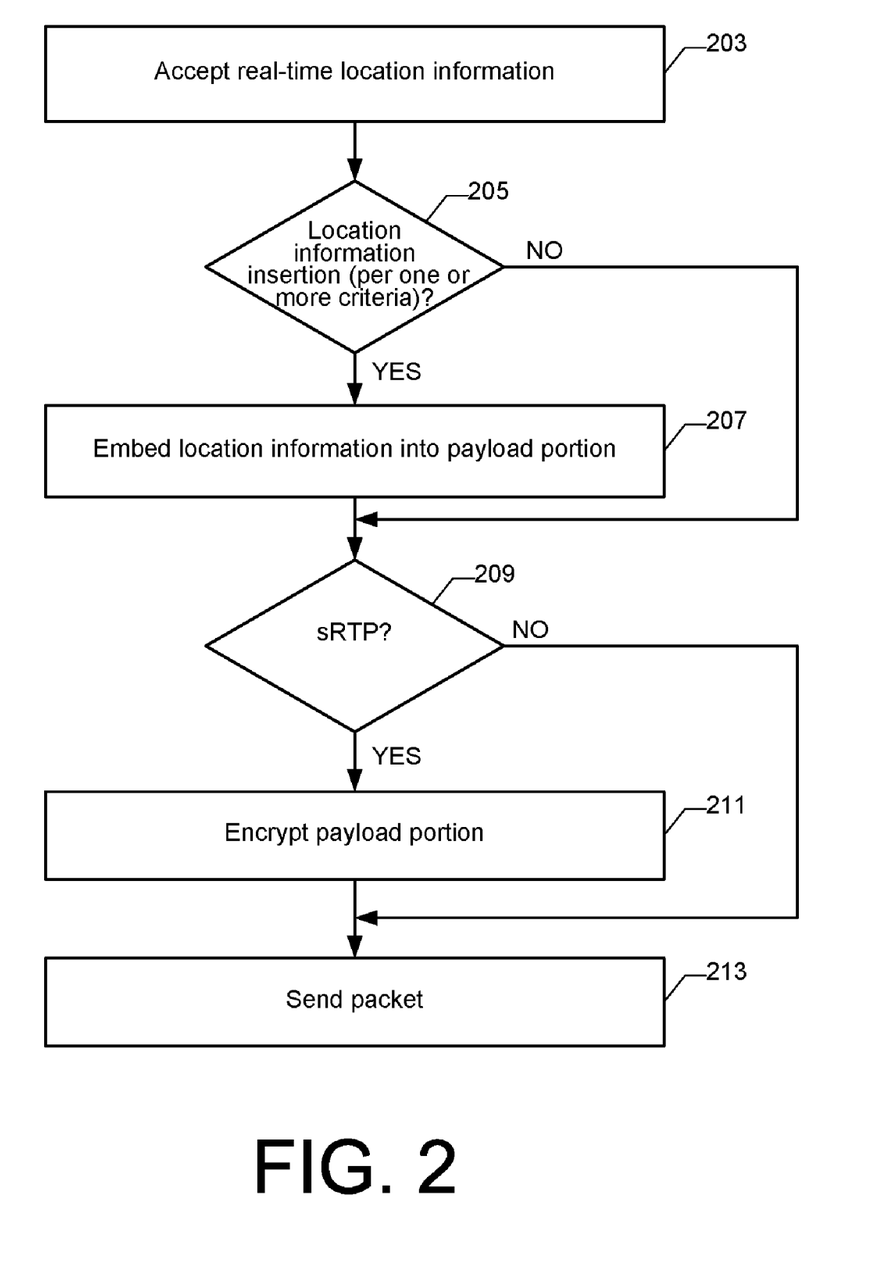
FIG. 2 shows a simplified flow chart of one embodiment of the invention implemented on a mobile device.

FIG. 2 shows a simplified flow chart of one embodiment of the invention implemented on a mobile device, e.g., device 100, and in some embodiments, carries out as a result of execution of instructions encoded on a medium, e.g., instructions 109 in memory portion 107 executing on the processor 105.

In 203, the method includes accepting real-time location information on the location of the mobile device 105. In one embodiment this is from a GPS receiver included in location information receiver/determiner 103. In another embodiment, the real-time location information is from a location determiner in location information receiver/determiner 103 that determined location based on information received from a network service.

In 205, the method includes ascertaining whether real-time information is to be included. In one embodiment, the ascertaining is according to one or more criteria. In one embodiment, information is included every pre-defined period of time. In one embodiment, the criteria include whether or not the location has changed from the last time the location was included in packets to the same recipient(s). The method includes maintaining in memory the last sent information, and, in one embodiment the time such information was sent. In one embodiment, the criteria include whether or not the location has and/or no location information has been sent for a defined amount of time or for a predefined number of times. In one embodiment, the criteria include the type of media information being included in a packet. For example, in the case that the media information is in the form of video compressed according to a compression method of frames of video information according to which some frames are independent of other frames, and some frames are predictive frames that are predicted from one or more past and/or one or more future frames, the location information is included in frames that are independent frames. For example, in the case the media is compressed according to the MPEG-2 standard that includes using predictive frames that are either B- or P-frames, and using independent frames that are I-frames, the location information is included whenever an I-frame is sent.

The pre-defined period in one version is settable. One or more of the other parameters used in the ascertaining also are settable in one implementation.

In the case it is ascertained that real-time location information is to be embedded, in 207, the accepted real-time location information is embedded in the payload portion of an RTP packet. In one embodiment in which the media is included in the form of Packetized Elementary Stream (PES) packets as specified in ISO/IEC standard ISO/IEC 13818-1 that describes how compressed video content is packetized, the location information is embedded in PES header as described in more detail below. No addition messages or packets are needed for the location information, so that the processing system 105 can efficiently and easily handle the extended media payload with minimal overhead.

In some embodiment, a security mechanism is included to encrypt information to guarantee the confidentiality of the media streams. One embodiment uses sRTP to secure the multimedia information, and Multimedia Internet KEYing (MIKEY) for exchanging keying materials for sRTP. The invention, however, is not limited to using such a security mechanism. Other mechanisms also are possible. For example, IPSec can be used to form tunnels. Other security mechanisms also are possible.

In 209, the method includes ascertaining if the media packet is to be encrypted, e.g., using sRTP. If it is determined that the media packet is to be encrypted, step 211 includes encrypting the payload of the RTP packets, including the embedded location information, e.g., using SRTP prior to sending the packet. In 213, the method includes sending the packet to one or more recipients.

Figure 3:
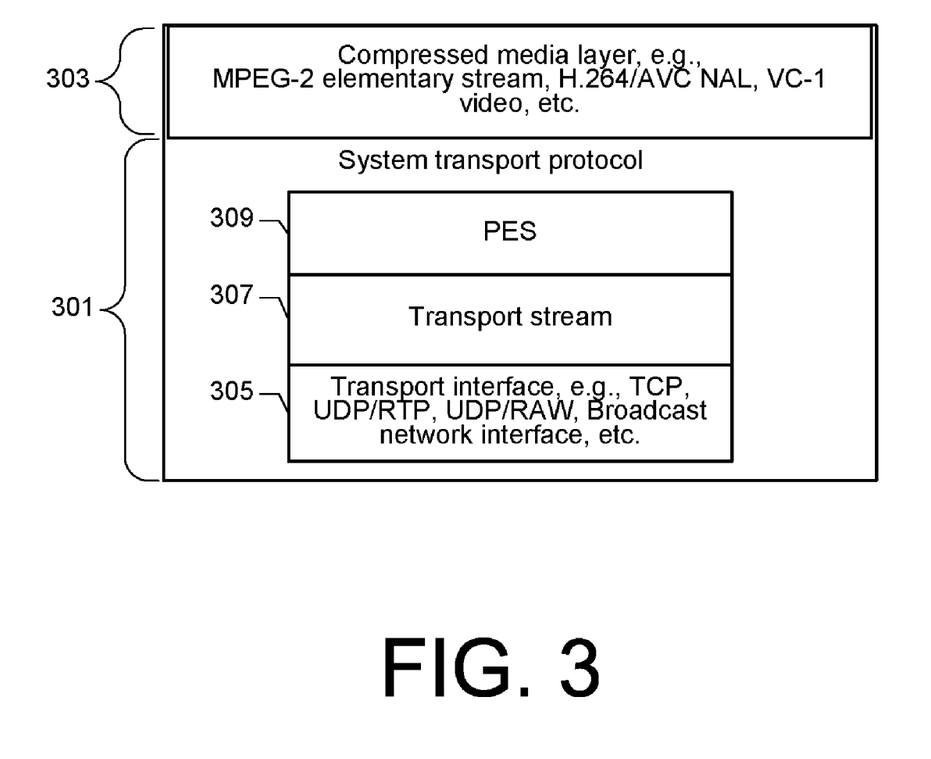
FIG. 3 shows a layered structure of transporting packetized compressed media. Embodiments of the present invention include having location information embedded in the payload part of media packets.

FIG. 3 shows a layered structure of transporting packetized compressed media, e.g., compressed audio or video. FIG. 3 shows a system transport protocol level 301 and a compressed media layer 303. Many systems transport protocols are possible, and the present invention is usable in many of these. For example, one embodiment uses ITU-T standard H.323 for transporting media over IP, often used for teleconferencing applications. Another embodiment uses MPEG-2 transport using Packetized Elementary Stream (PES) packets as specified in ISO/IEC standard ISO/IEC 13818-1 that describes how compressed video content is packetized. Note the transport layer 301 can be independent of how the media is compressed in the compressed media layer 303, so, for example, specifying MPEG-2 transport per ISO/IEC standard ISO/IEC 13818-1 does not limit how the media is compressed. ISO/IEC 13818-1 has been extended to other compression methods. The media layer 303 may be compressed according to MPEG-2, according to the newer ITU-T standard H.264/AVC, according to the Society of Motion Picture and Television Engineers (SMPTE) standard 421M, also known as the VC-1 standard, Audio Video Standard (AVS) promoted by China, or any of a variety of methods. Furthermore, within the transport system layer, various mechanisms can be used to send the data, e.g., over IP, including RTP packets.

In the case of MPEG-2 compression for the compressed media layer, the data unit that is packetized and transported at the network system layer 301 is an MPEG-2 elementary stream (ES). In the case of H.264/AVC, the data unit is the Network Abstraction Layer (NAL) unit.

PES packets as described in ISO/IEC 13818-1 are used herein to illustrate the invention, and MPEG-2 compression is assumed, without limiting the invention to such compression. With in the transport protocol, at the transport system level 301, the packets are structured in the selected transport interface 305. The description herein assumes use of UDP/RTP according to which the packets use RTP. The location information is in the payload portion of the RTP packets. At the next level 305, the payload is in the form of stream format 307 that in one embodiment is in the form of MPEG-2 transport stream TS packets which include multiplexed elementary stream (ES) data. The ES stream data encapsulated in the transport stream is in PES packets at the PES level 309.

Figure 4:
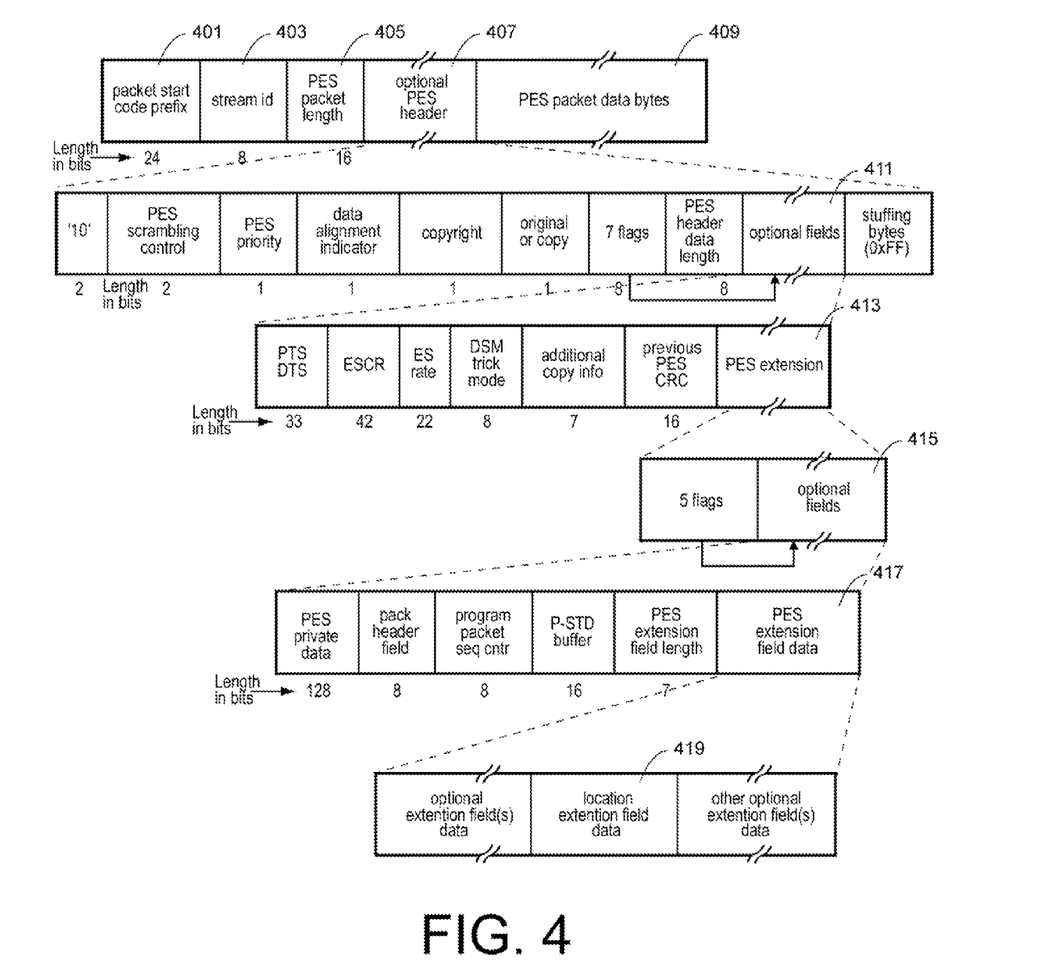
FIG. 4 shows the structure of a PES packet in which location information in embedded in particular embodiments of the invention.

FIG. 4 shows the structure of a PES packet. The drawing is based on a similar drawing in the 2000 version of the ISO/IEC standard 13818-1. More details are in Section 2.4.3.6 of the 2000 version of the ISO/IEC 13818-1 standard, in particular, in Table 2-18 and its description. However, FIG. 4 is sufficient to illustrate the invention sufficient for one in the art to implement a method and apparatus as described herein. A PES packet starts with a 4 byte start code, that includes a 3-byte packet start code prefix 401 having value 0x0000001, where 0x denotes hexadecimal and a 1 byte stream ID 403 that identifies the type of stream. For example, in MEPG-2, audio streams are identified by stream id of between 0xC0 and 0xDF, while video streams are identified by a stream id of 0xE0 to 0xEF. This is followed by a 2-byte PES header length 405 which can be zero, and when the PES header embeds the location information, the PES header length 405 is not zero. The next field is the PES header 407, which in general is optional, but in one embodiment embeds the location information. The fields that follow include the PES payload.

In one embodiment of the invention, the location information is embedded in the PES header 407. Starting in the tenth byte of the PES header are up to seven optional fields 411. Which optional fields are in use is indicated by a set of 7 flags in the header. In one embodiment of the invention, the location information is embedded in one of the optional fields of a PES header that starts at the tenth byte of the PES header. As also shown in FIG. 4, the PES header also includes a PES extension portion 413 as one of the optional fields. The PES extension portion 413 is for use for extensions to the PES header in the form of up to five optional fields 415 indicated by flags. For example, one extension field is used to indicate the media data is compressed in the VC-1 format. Such extensions may become parts of the standard at some future date. In one embodiment of the invention, the location information is embedded in the PES extension of a PES header as one of the PES extension's optional fields 415. As shown in FIG. 4, the optional fields include PES extension field data 417. In one embodiment, the location information is embedded in the PES extension field data 417.

In one embodiment, the PES extension field data 417 is further layered into at least one additional layer so that several optional fields of the PES extension field data 417 are available. One such field is for location information, and is indicated by the assertion of one or more pre-defined location bits, called a location mask herein.

In another embodiment, the whole of the PES extension field data 417 is used for the location data.

Figure 5:
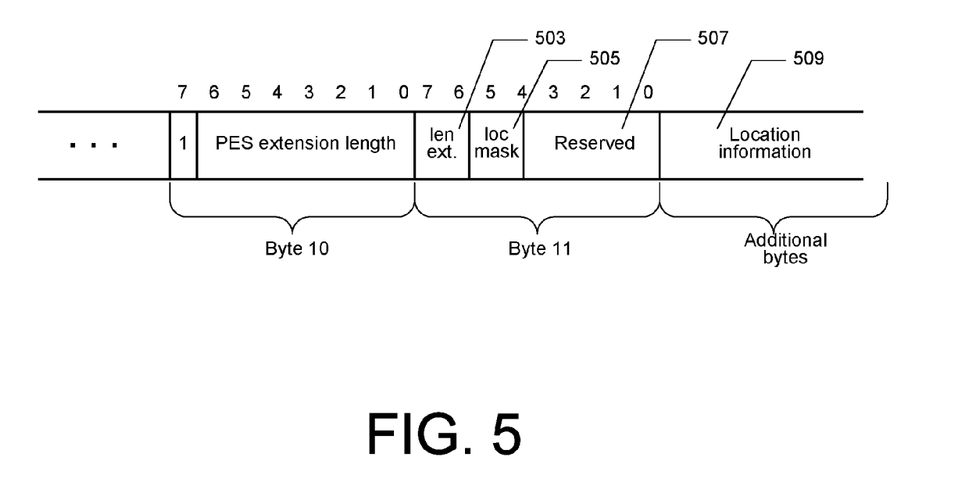
FIG. 5 shows a simplified view of a portion of PES header of a PES packet in which location information in embedded in particular embodiments of the invention.

In more detail, FIG. 5 shows a simplified view, assuming that the only optional field 411 is the PES extension. The form of the location extension is such that Byte 11 and the following additional bytes are modified from what is now the standard to embed real-time location information. The modifications do not affect operability of the stream so long as there is not a conflicting extension field.

In detail, FIG. 5 shows the field 503 denoted "len ext." that presents the additional most significant two bits for the PES extension length. The field 505 denoted "loc mask" presents the mask for indicating the location insertion with two bits. The remaining 4 bits left in Byte 11 are reserved for future use or other data use. The loc mask is used to indicate whether and where the location information is located. The information block for real-time location information is added after Byte 11, and its length is reflected in Byte 10 and Byte 11.

A typical method of transmitting MPEG-2 elementary stream data from a video or audio encoder includes creating PES packets from the elementary stream data and encapsulating these PES packets inside transport stream (TS) packets or program stream. The TS packets can then be multiplexed and transmitted using broadcasting techniques, such as those used in an ATSC and DVB.

Streams that conform to other video encoding standards, such as ITU H.264/AVC, the Chinese AVS system, VC-1, and other coding streams also are similarly constructed. From the description herein, one can also construct a method of embedding real-time location information for new compressed streams whose specification becomes known in some future date. Note that in the case of H.264/AVC and for VC-1, several video pictures are able to be carried in a single PES packet.

In one embodiment, using MPEG-2 video stream, PES packets whose stream indicates they are I-frames are used to carry real-time location information. Predictive frames, i.e., in MPEG-2, B-frames and P-frames are not used to carry location information.

Note that the PES header structure shown is for a simple case. Those in the art will understand that the method of constructing PES packets with embedded location information can vary depending on the application. For example, for information on how PES headers are structured for broadcast systems, see "Specification for the use of Video and Audio Coding in Broadcasting Applications based on the MPEG-2 Transport Stream," DVB Document A001 Rev. 7, February 2007, by the Digital Broadcasting Video Board Office. The document is available at www~dot~dvb~dot~org/technology/standards/a001r7~dot~tm1214r30~dot~dTS101154~dot~v1~dot~8~dot~1~dot~pdf (retrieved 10 May 2008), where ~dot~ denotes a period in the actual URL.

In one embodiment, the real-time location information embedded in the PES header is in a form specified in Geography Markup Language (GML). GML is the XML grammar defined by the Open Geospatial Consortium (OGC) to express geographical features. See www~dot~opengeospatial~dot~org/standards/gml (retrieved 10 May 2008) for a set of links to the GML standard, where ~dot~ denotes the period in the actual URL.

Figure 6:
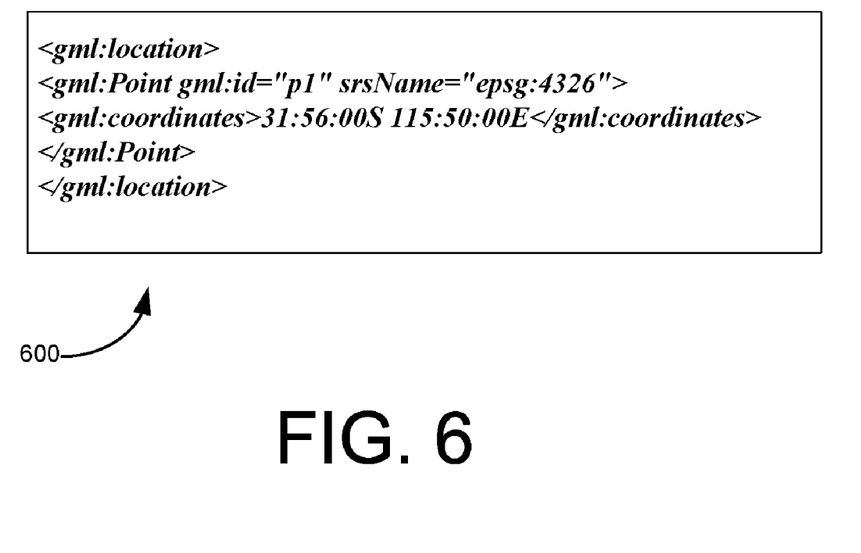
FIG. 6 shows a GML construct used in one embodiment of the invention for real-time location data.

FIG. 6 shows a GML construct 600 used in one embodiment of the invention for the real-time location data.

Thus, the embedding of the location information (referring to the flowchart of FIG. 2) includes setting the appropriate indication in the PES header that location information is included, formatting the location information, and embedding the location information in the PES header.

Figure 7:
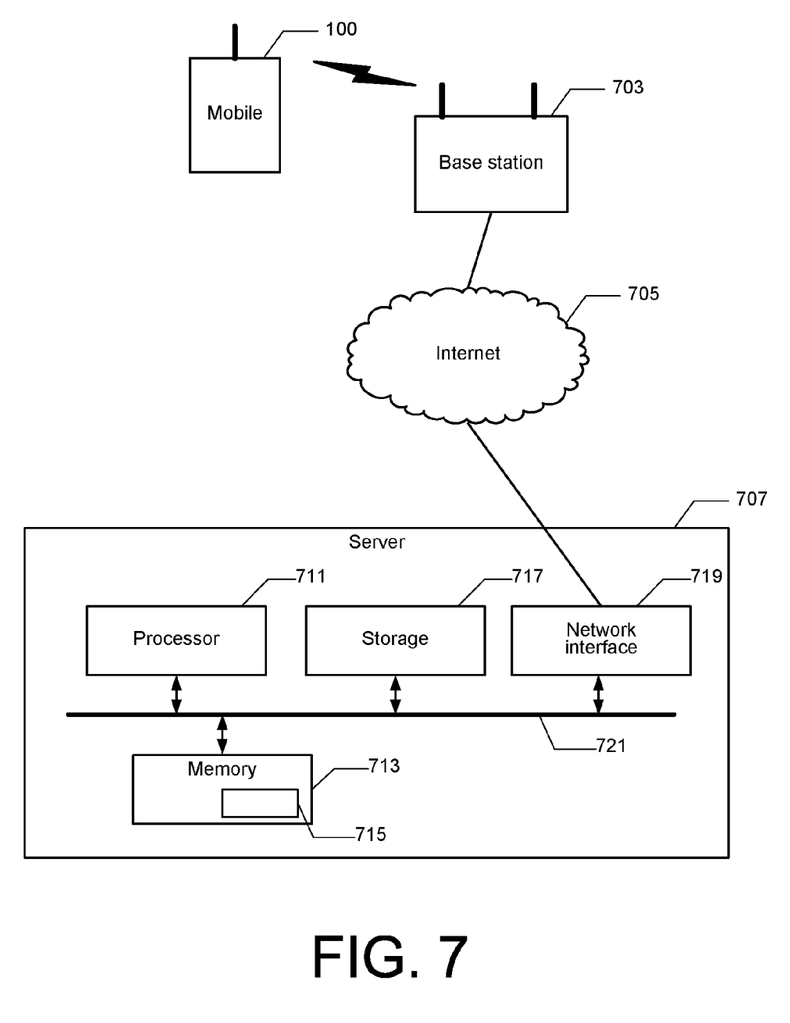
FIG. 7 shows a simple block diagram of an embodiment of an apparatus configured to receive media packets that can include location information.

FIG. 7 shows a simple block diagram of an embodiment of an apparatus configured to receive media packets that can include location information. In particular, FIG. 7 shows a simple block diagram of a location server 707 coupled to the Internet 705. A wireless mobile unit 100 is coupled to the wireless server 707 via a wireless link between the mobile 100 and a base station or access point 703 that is coupled to the Internet 705. In one embodiment, the mobile unit is as described above with reference to FIG. 1, and operates to embed real-time location information in PES of I-frames of a media stream as described hereinabove, and to send the stream to the location server using RTP as described hereinabove with reference to the flowchart of FIG. 2.

The location server 707 includes a processing system shown in FIG. 7 in simplified form. The server 707 includes at least one processor, shown as a single processor 711, memory 713, a storage subsystem 717 that includes hard disk storage, and in some embodiments, also one or more other forms of storage. At least one network interface device 719 is included. Other elements also included are not shown in FIG. 7 to keep the drawing simple in order not to distract from the main features. The elements of the server 707 are coupled by a bus subsystem 721, shown for simplicity as a single bus, although those in the art will understand that such a bus subsystem is much more complex.

Figure 8:
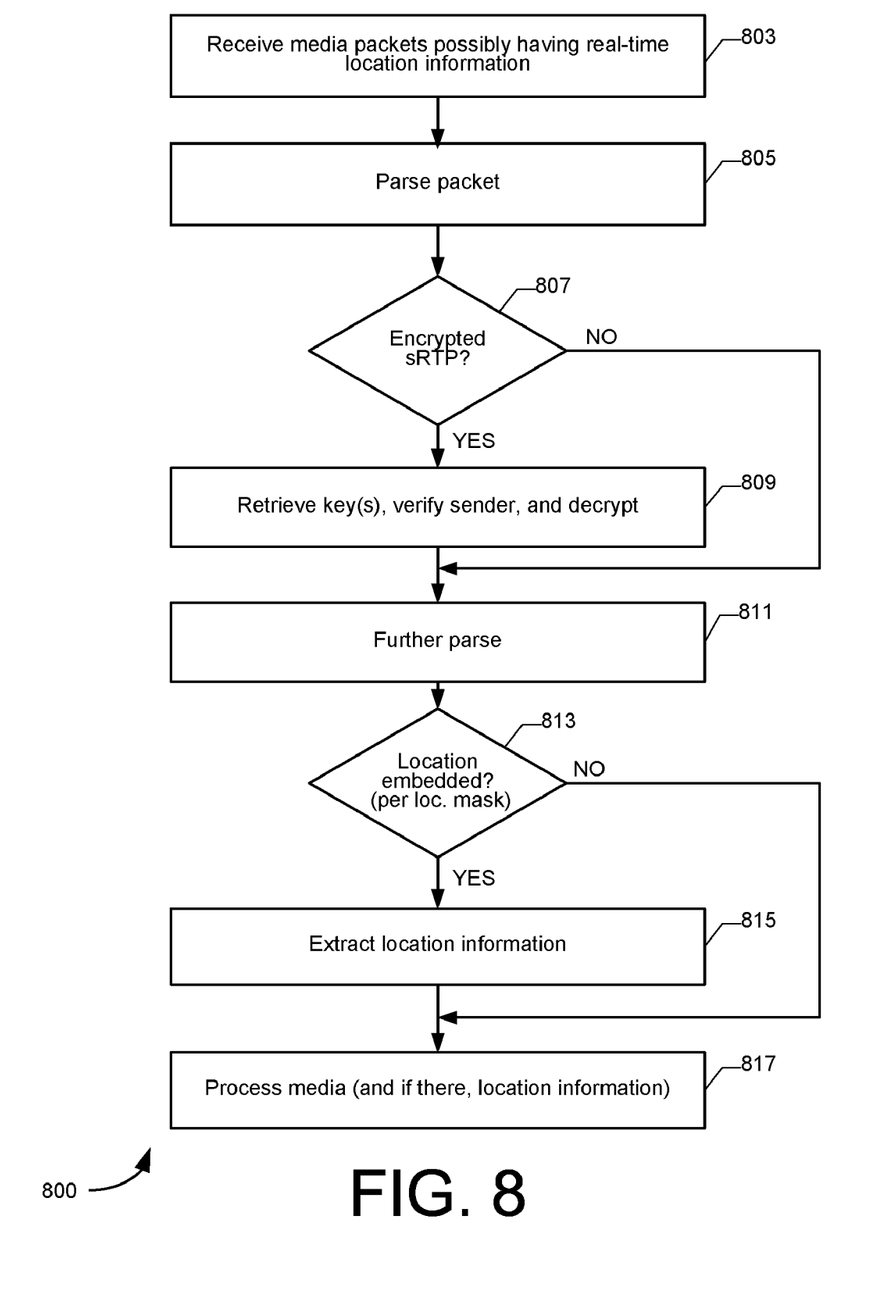
FIG. 8 shows a simplified flowchart of a method embodiment of the invention practiced at the apparatus of FIG. 7 that is configured to receive media packets that can include location information.

FIG. 8 shows a simplified flowchart of a method embodiment of the invention practiced at the apparatus of FIG. 7 that is configured to receive media packets that can include location information. In particular, FIG. 8 shows a simplified flowchart of a method practiced at the server 707, e.g., as a result of execution of software stored in one or more computer readable media at the server. A similar method may be carried out by a peer mobile device receiving packets containing location information embedded in the payload of the media stream. Other embodiments include a computer readable medium that encodes a program, i.e., instructions that when executed by the processor(s) 711 cause the method of the flowchart of FIG. 8 to be carried out. In FIG. 7, the instructions are shown as 715 in the memory. Those in the art will understand that the instructions may not all be in memory at the same time, and that initially may reside in the storage subsystem. Furthermore, the instructions may be initially encoded on an optical medium, such as a CD or a DVD. Thus, the computer-readable medium may be embodied in any one of these forms, and other forms, as would be clear to one in the art.

Turning now to the flowchart of FIG. 8, an example method of receiving mobile device location information embedded in the payload of media packets is shown and indicated by reference numeral 800. The method includes in 803 receiving packets of a media stream or program from a mobile device. Assume the transport is using RTP, and if encrypted, using sRTP. The method includes ascertaining in 805 parsing the packets and in 807 ascertaining if the packet is encrypted, e.g., in sRTP. If the packet is encrypted, the method includes in 809 retrieving the appropriate decryption key, verifying the sender if such verification is included, and decrypting the packet. The method includes in 811 further parsing the packet to the layer that enables checking the payload portion, e.g., the PES header. The method includes in 813 ascertaining if location information is embedded, e.g., in the PES header as indicated by the loc. mask. If the location mask information is included, the PES header is further parsed in 815 to extract the location information. The method continues in 817 with any processing of the media and, in the case location information is included, any processing of the location information.

Alternate methods include a method in a mobile device configured to receive media streams or programs that can include real time location information embedded in the media payload. One embodiment of such a mobile device is essentially the same as the mobile device of FIG. 1, with the instructions in the memory including instructions that can carry out a method essentially similar to that shown in the flowchart of FIG. 8, but the receiving being at the second mobile device.

One embodiment includes using Compressed RTP (cRTP) that is defined for slow links, or links with other problems. cRTP is defined in IETF RFC 2508 titled "Compressing IP/UDP/RTP Headers for Low-Speed Serial Links" and as Enhanced Compressed RTP (cRTP) in IETF RFC 3545 titled "Enhanced Compressed RTP (CRTP) for Links with High Delay, Packet Loss and Reordering" CRTP is used with IP, UDP, and RTP headers remain consistent. All three headers are compressed. Because it is the payload part that carries the location information, adding a compressing step according to the CRTP method, e.g., to the flowchart of FIG. 2 would be clear to one in the art. Similarly, adding a decompressing step according to the CRTP method, e.g., to the flowchart of FIG. 8 would be clear to one in the art.

Apparatus embodiments of the invention include an apparatus for sending media information that operates, for example, as mobile device 100 with a processor that is configured, e.g., with instructions in memory, to cause carrying out a method such as shown in FIG. 2.

Other apparatus embodiments of the invention include an apparatus for receiving media information that operates, for example, as server 707 with a processor that is configured, e.g., with instructions in memory (including in storage), to cause carrying out a method such as shown in FIG. 8, or in an alternate embodiment, a second mobile device with architecture essentially the same as device 100 with a processor that is configured, e.g., with instructions in memory, to cause carrying out a method such as shown in FIG. 8.

Thus methods, apparatuses, and computer readable media have been described for dealing with, e.g., embedding real-time location information in the payload portion of media packets, or extracting real-time location information that is embedded in the payload portion of media packets.

The methods described herein are "generic" in that different embodiments can be applied to some existing multimedia formats as well as to proprietary and to not yet existing multimedia formats The methods described herein are "lightweight" in that they require very little overhead to media transmission. The methods described herein are also are fully scalable in that they do not require using addition signaling messages or (additional) RTCP packets.

The privacy of location information can be easily protected from end-to-end with the combinations of sRTP or other security mechanisms on media paths.

This new mechanism can be applied in multicast multimedia sessions for sharing location information.

In one embodiment, a medium is encoded with computer-implemented instructions that when executed by one or more processors of a processing system, e.g., in an encoding system or sub-system cause one or more encoding subsystems to carry out any of the methods described herein.

One embodiment is in the form of logic encoded in one or more tangible media for execution and when executed operable to carry out any of the methods describe herein. One embodiment is in the form of software encoded in one or more computer-readable media and when executed operable to carry out any of the methods described herein.

In keeping with common industry terminology, the terms "base station", "access point" may be used interchangeably herein to describe an electronic device that may communicate wirelessly and substantially simultaneously with multiple other electronic devices, while the terms "client," "mobile device" may be used interchangeably to describe any of those multiple other electronic devices, which may have the capability to be moved and still communicate, though movement is not a requirement. However, the scope of the invention is not limited to devices that are labeled with those terms.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic encoded on one or more computer-readable tangible media in which are encoded a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a medium in which are encoded a set of instructions, e.g., a computer program that are for execution on one or more processors, e.g., one or more processors that are part of an encoding system. Thus, as will be appreciated by those skilled in the art, embodiments of the present invention may be embodied as a method, an apparatus such as a special purpose apparatus, an apparatus such as a data processing system, or a medium, e.g., a computer program product. The computer-readable medium carries logic including a set of instructions that when executed on one or more processors cause the apparatus that includes the processor or processors to implement a method. Accordingly, aspects of the present invention may take the form of a method, an entirely hardware embodiment, an entirely software embodiment or an embodiment combining software and hardware aspects. Furthermore, the present invention may take the form of medium (e.g., a computer program product on a computer-readable storage medium) carrying computer-readable program code embodied in the medium.

While a medium is shown in an example embodiment to be a single medium, the term "medium" should be taken to include a single medium or multiple media (e.g., a centralized or distributed database, and/or associated caches and servers) that store one or more sets of instructions. The term "medium" shall also be taken to include any medium that is capable of storing, encoding a set of instructions for execution by one or more of the processors and that cause one or more processors to perform any one or more of the methodologies of the present invention. A medium may take many forms, including tangible storage media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. For example, the term "medium" shall accordingly be taken to included, but not be limited to, solid-state memories, a computer product embodied in optical and magnetic media.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

It should further be appreciated that although the invention has been described in the context of MPEG-2, the invention is not limited to such contexts and may be used in various other applications and systems, for example in a system that uses H.264/AVC or other compressed media streams, whether conforming to a published standard or not. Furthermore, the invention is not limited to any one type of network architecture and method of encapsulation, and thus may be used in conjunction with one or a combination of other network architectures/protocols.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus comprising:
    a location information receiver/determiner operative to receive and/or determine the location of the apparatus;
    a processing system including one or more processors and a memory portion;
    wherein the apparatus is operative to transmit media information as media packets that include a payload portion,
    wherein the processing system has stored therein instructions that when executed in the processing system cause the location information to be embedded in the payload portion of at least one of the media packets,
    such that the apparatus can transmit the location information embedded in the payload portion.

2. An apparatus as recited in claim 1, wherein the location information receiver/determiner include a GPS receiver.

3. An apparatus as recited in claim 1, wherein the location information receiver/determiner is operative to determine the location information using one or more location determining methods.

4. An apparatus as recited in claim 1, wherein media packets are sent as RTP packets.

5. An apparatus as recited in claim 1, wherein in the case security is desired, media packets are sent encrypted.

6. An apparatus as recited in claim 1, wherein the apparatus is configured to ascertain if encryption is to be used, and if so, to encrypt the media packets.

7. An apparatus as recited in claim 6, wherein the encrypting uses sRTP.

8. An apparatus as recited in claim 1, wherein the media packets are compressed media packets formatted in packetized elementary stream packets, referred to as PES packets, and wherein the location information is encoded in some of the PES packets.

9. A method in a mobile device comprising:
    accepting real-time location information on the location of the mobile device;
    ascertaining whether real-time information is to be included, the ascertaining being according to one or more criteria;
    in the case it is ascertained that real-time location information is to be included, embedding the accepted location in a payload portion of a media packet; and
    sending the packets including location information in at least some of the packets.

10. A method as recited in claim 9, wherein the packets are RTP packets, such that the embedding of the location information is in the payload portion of at least some RTP packets.

11. A method as recited in claim 10, wherein media information in media packets includes video compressed according to a compression method for frames of video information according to which some frames are independent of other frames, and some frames are predictive frames that are predicted from one or more past and/or one or more future frames, the location information is included in frames that are independent frames.

12. A method as recited in claim 10, wherein the location information is embedded every pre-defined period of time.

13. A method as recited in claim 10, wherein the one or more criteria include whether or not the location has changed from the last time the location information was included in a packet sent to the same recipient.

14. A method as recited in claim 10, wherein the one or more criteria include whether or not the location has changed since the last time the location information was included in a packet sent to the same recipient and/or whether or not no location information has been sent for a defined amount of time or for a predefined number of times.

15. A method as recited in claim 10, wherein the method further comprises ascertaining if the media packet is to be encrypted, and if so, prior to the sending, encrypting the payload of the RTP packet including any embedded location information.

16. A method as recited in claim 10, wherein media information in media packets includes packetized elementary stream packets, referred to as PES packets, and wherein the location information is embedded in a PES header in a PES packet.

17. A computer-readable medium having encoded thereon instructions that when executed by one or more processors of a processing system cause carrying out a method, the method being in a mobile device and comprising:
    accepting real-time location information on the location of the mobile device;
    ascertaining whether real-time information is to be included, the ascertaining being according to one or more criteria;

in the case it is ascertained that real-time location information is to be included, embedding the accepted location in a payload portion of a media packet; and sending the packets including location information in at least some of the packets.

18. A computer readable medium as recited in claim 17, wherein the packets are RTP packets, such that the embedding of the location information is in the payload portion of at least some RTP packets.

19. A computer readable medium as recited in claim 18, wherein media information in media packets includes video compressed according to a compression method for frames of video information according to which some frames are independent of other frames, and some frames are predictive frames that are predicted from one or more past and/or one or more future frames, the location information is included in frames that are independent frames.

20. A computer readable medium as recited in claim 18, wherein one or more criteria include whether or not the location has changed from the last time the location information was included in a packet sent to the same recipient.

21. A computer readable medium as recited in claim 18, wherein media information in media packets includes packetized elementary stream packets, referred to as PES packets, and wherein the location information is embedded in a PES header in a PES packet.

22. A method comprising:

receiving packets of a media stream or media program from a mobile device, the packets including a payload portion that includes compressed media data;

parsing a received packet;

ascertaining if location information is embedded in the payload portion of the received packet; and in the case location information is embedded, extracting the location information, wherein in the case location information is embedded, the location information was embedded in the payload portion by the mobile device and is indicative of the location of the mobile device.

23. A method as recited in claim 22, wherein the packets are encrypted, and wherein the method further comprises prior to the ascertaining if location information is embedded, ascertaining if the packet is encrypted, and if the packet is encrypted, retrieving the appropriate decryption key, and decrypting the packet.

24. A method as recited in claim 22, wherein the packets are RTP packets, such that in the case location information is embedded, the location information is in the payload portion of a RTP packet.

25. A method as recited in claim 24, wherein media data in the received packets includes video compressed according to a compression method for frames of video information according to which some frames are independent of other frames, and some frames are predictive frames that are predicted from one or more past and/or one or more future frames, the location information is included in frames that are independent frames.

26. A method as recited in claim 24, wherein media data in the received packets includes packetized elementary stream packets, referred to as PES packets, and wherein the location information is embedded in a PES header in a PES packet.

* * * * *

UNITED STATES PATENT AND TRADEMARK OFFICE
CERTIFICATE OF CORRECTION

| | | |
|---|---|---|
| PATENT NO. | : 8,238,935 B2 | Page 1 of 1 |
| APPLICATION NO. | : 12/127662 | |
| DATED | : August 7, 2012 | |
| INVENTOR(S) | : Chen et al. | |

It is certified that error appears in the above-identified patent and that said Letters Patent is hereby corrected as shown below:

In Column 6, line 15, after "value", kindly replace "0x0000001" with --0x000001--.

Signed and Sealed this
Eleventh Day of September, 2012

David J. Kappos
*Director of the United States Patent and Trademark Office*